April 8, 1969   A. MAZURKEVICS   3,437,916
THREE LIGHT TESTING ARRANGEMENT FOR TESTING THE VOLTAGE
OUTPUT OF AUTOMOBILE VOLTAGE REGULATORS
Filed Oct. 23, 1965
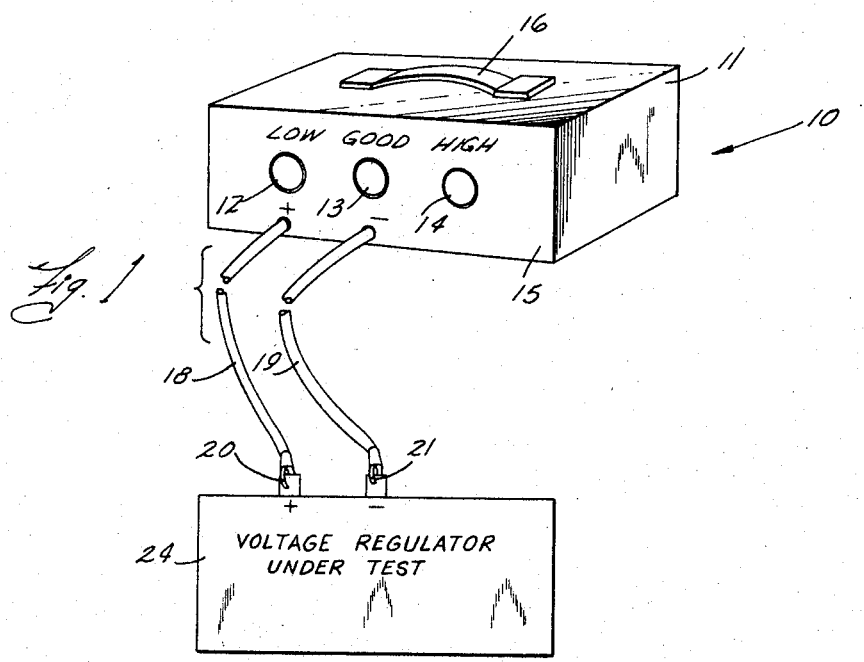
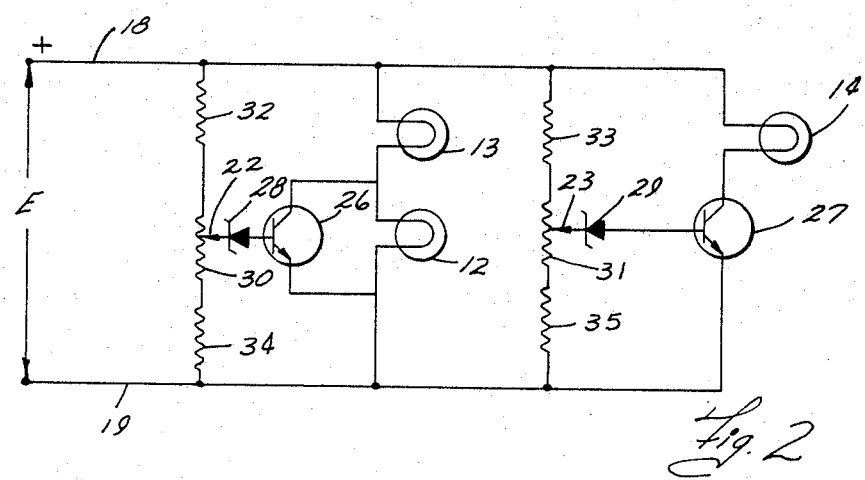
INVENTOR.
ANATOLIJS MAZURKVICS
BY
ATTORNEYS

United States Patent Office 3,437,916
Patented Apr. 8, 1969

3,437,916
THREE LIGHT TESTING ARRANGEMENT FOR TESTING THE VOLTAGE OUTPUT OF AUTOMOBILE VOLTAGE REGULATORS
Anatolijs Mazurkevics, Kalamazoo, Mich., assignor to Allen Electric and Equipment Company, Kalamazoo, Mich., a corporation of Michigan
Filed Oct. 23, 1965, Ser. No. 503,907
Int. Cl. G01r 31/02
U.S. Cl. 324—28     1 Claim

ABSTRACT OF THE DISCLOSURE

A testing arrangement for testing the voltage across the output terminals of an automobile voltage regulator having three lights whose sources of energy are biased in a manner such that the output voltage of the voltage regulator will cause the selected lights to be turned on and off for indicating the condition of the voltage regulator prior to and during adjustment of said regulator.

---

This invention relates to a tester for automobile voltage regulators, and more particularly, relates to the use of a system of light which are switched on and off as the voltage regulator is being adjusted to indicate when a proper adjustment is obtained.

Testers for automobile voltage regulators have, in the past, involved the use of meters whose faces have usually been divided into three zones. These zones are designated as "low zone," a "good zone" and a "high zone." When a voltage regulator needs adjustment, the operator must read the meter correctly in order to achieve a good voltage regulator adjustment. Since there exists, by the use of such meters, a line dividing the "good zone" from the "low zone," and a line dividing the "good zone" for the "high zone," inexperienced operators, in adjusting the voltage regulator, may on some occasions stop adjusting when the needle on the meter barely reaches the "good zone" and not try to center the needle within the "good zone." On other occasions the inexperienced operator may see the needle just inside the "low" or "high zone" and conclude that the needle is so close to the "good zone" that the voltage regulator needs no adjustment.

Another disadvantage of the present method employed is that the meter must be placed close enough to the voltage regulator being tested to be readable by the workman, and this often places the meter into a location which is only dimly lighted and thus it becomes difficult to read the meter at all.

Accordingly, the objects of this invention include:
(1) To provide a tester which comprises a system of lights, which become alluminated when the output voltage of a voltage regulator is either low, good or high.
(2) To further provide a system of lights that are clearly visible at a distance from the voltage regulator being tested.
(3) To further provide a tester in which the judgment of an inexperienced operator is not required.
(4) To further provide an accurate, but yet inexpensive, tester.
(5) To further provide a tester which is simple to operate.

Other objects and purposes of this invention will become apparent to persons familiar with this type of equipment upon reading the following specification and examining the accompanying drawings, in which:

FIGURE 1 is a perspective view of a tester for automobile voltage regulators and embodying the invention.

FIGURE 2 is an electrical schematic of the tester.

General description

The objects and purposes of the invention, including those set forth above, have been met by providing a device which consists of three lights whose sources of energy are biased in a manner such that the output voltage of a voltage regulator will cause the selected lights to be turned on and off for indicating the condition of the voltage regulator prior to, or during, adjustment of said regulator.

Detailed description

Testing unit 10 (FIGURE 1) comprises an enclosure 11 having four side walls, a top wall and a bottom wall, and contains a plurality of signal means, or lights 12, 13 and 14 protruding from the front wall 15. A handle 16 is mounted on the top wall 17 of enclosure 11 for easily carrying said enclosure 11 from one place to another in the work shop. Extending outwardly from the front wall 15 of enclosure 11 is a pair of conductors 18 and 19 having at their outermost ends a pair of clips 20 and 21, respectively, which are fastenable to the terminals of the voltage regulator 24.

The electrical system of the testing unit is mounted in a conventional manner inside the enclosure 11. FIGURE 2 is a schematic of that electrical system. It contemplates the use of two electrically controlled switches, such as transistors 26 and 27. The electrical system is essentially divided into two parts. The first system, comprising transistor 26, functions when the output voltage E of a voltage regulator is good. The second system, comprising transistor 27, functions when the output voltage E of a voltage regulator is too high. The first system contemplates the use of a potentiometer 30. Connected to one end thereof, is one end of a resistor 32 and the other end of the resistor 32 is connected to conductor 18. The other end of the potentiometer 30 is connected to one end of a resistor 34 and the other end of the resistor 34 is connected to conductor 19. The center tap 22 of the potentiometer 30 is connected to the cathode of the Zener diode 28. The anode of the Zener diode 28 is connected to the base of the transistor 26. The collector of the transistor 26 is connected to one end of lights 12 and 13 and the other end of the light 13 is connected to conductor 18. The other end of light 12 is connected to conductor 19 and the emitter of transistor 26.

The second system contemplates the use of a potentiometer 31. Connected to one end thereof, is one end of a resistor 33 and the other end of the resistor 33 is connected to conductor 18. The other end of the potentiometer 31 is connected to one end of a resistor 35 and the other end of resistor 35 is connected to conductor 19. The center tap 23 of the potentiometer 31 is connected to the cathode of the Zener diode 29. The anode of the Zener diode 29 is connected to the base of the transistor 27. The collector of the transistor 27 is connected to one end of light 14 and the other end of light 14 is connected to conductor 18. The emitter of transistor 27 is connected to conductor 19.

Operation

The output voltage E of a voltage regulator 24 is the source of voltage for the operation of the testing unit. When the voltage is too low, the biasing of the Zener diode 28 by resistor 34 and potentiometer 30 will not allow the transistor 26 to be switched on. As a result, the collector-emitter path through the transistor 26 is, for all practical purposes, an open circuit. Therefore, the current must pass through the series combination of lights 12 and 13. Light 12 is a low wattage light, whereas, light 13 is a high wattage light. Since the current is passing through both lights, the voltage drop across the high wattage light is not sufficient to illuminate it. However, the voltage drop across the low wattage light 12 is sufficient to illuminate it brightly. Light 12 is usually a red light indicating the bad, or low condition of the voltage regulator. No current can pass through light 14 because the transistor 27 is likewise not turned on due to insufficient voltage between the conductors 18 and 19.

When the output voltage of the voltage regulator 24 is higher so that it is considered to be good, the proper biasing of the Zener diode 28 by resistor 34 and potentiometer 30 causes the Zener diode to break down at this point and to allow passage of a current to the base of the transistor 26. Resistor 32 governs the amount of current to the base so that it will not destroy the Zener diode 28. Since the base current has now increased from zero amperes to a specified value, the transistor 26 is switched on. The impedance through the collector-emitter path of transistor 26 is very small and is, for all practical purposes, a short circuit. This means that the light 12 is now shorted out and the entire voltage drop is now across the high wattage light 13. Light 13 is now illuminated, and is usually a green light indicating the good condition of the voltage regulator.

When the output voltage of the voltage regulator 24 is even higher so that it is considered to be too high, the proper biasing of the Zener diode 29 by resistor 35 and potentiometer 31, causes the Zener diode 29 to break down at this point and allow passage of a current to the base of the transistor 27. Resistor 33 governs the amount of current into the base of transistor 27 so that it will not destroy the Zener diode 29. Since the base current has increased from zero amperes to a specified value, the transistor 27 is switched on. The impedance through the collector-emitter path of transistor 27 is very small and is, for all practical purposes, a short circuit. This means that light 14 is now illuminated, and may be a red light indicating a bad or high condition of the voltage regulator.

Thus, when the output voltage is either too low, or too high, so that the red lights 12 or 14, respectively, are on, the voltage regulator 24 needs to be adjusted. The potentiometers 30 and 31 can be adjusted so as to permit a very small range in which only the green light is on. This is desirable because voltage regulators need to be precisely adjusted.

Of course if desired other color combination of lights can be used, such as red to indicate that the regulator output is too low, green is to indicate that it is satisfactory and blue to indicate that it is too high. Again, however, the regulator is to be adjusted until only the green light is showing.

The embodiments of the invention in which an exclusive property or privilege is claimed are defined as follows:

1. A testing arrangement for testing the voltage across the output terminals of an automobile voltage regulator, the combination comprising:

means defining a housing;
   first, second and third light means secured to said housing on one side thereof and simultaneously visible for lighting in response to a voltage regulator output voltage being, respectively, less than a desired range, within a desired range and above a desired range, lighting of said first and second light means being independent of lighting of said third light means, said first light means having a lower wattage value than said second light means whereby when the voltage across said output terminals of said voltage regulator is below said desired range, the current will be insufficient to illuminate said second light means but will be sufficient to illuminate said first light means;

first and second elongated conductors extending outwardly of said housing and having gripping means on the outermost ends thereof for releasably connecting said first and second conductors to said output terminals of said voltage regulator at a location spaced from said housing;

a first subcircuit comprising a first transistor having a base, emitter and collector, a first voltage divider network connected between said first and second conductors, said first voltage divider network including a first potentiometer having a first center tap, a first Zener diode connected between said first center tap and said base of said first transistor, the setting of said first center tap and said first Zener being selected so that said first Zener will conduct at a first voltage regulator output voltage, said first and second light means connected in series between said first and second conductors and parallel with said first voltage divider network, said emitter and collector of said first transistor being connected across said first light means whereby when said first transistor is in a conducting state, said first light means will be shorted out;

a second subcircuit different from said first subcircuit comprising a second transistor having a base, emitter and collector, a second voltage divider network connected between said first and second conductors and parallel with said first voltage divider network, said second voltage divider network including a second potentiometer having a second center tap, a second Zener diode connected between said second center tap and said base of said first transistor, the setting of said second center tap and said second Zener being selected so that said second Zener will conduct at a second voltage regulator output voltage exceeding said first voltage by a difference, said first and second voltages bounding said desired range, said third light means being connected in series with said emitter and collector of said second transistor between said first and second conductors whereby when said second transistor is in a conducting state, said third light means is turned on.

References Cited

UNITED STATES PATENTS

| | | | |
|---|---|---|---|
| 3,045,184 | 7/1962 | Stetzler | 324—158 |
| 3,157,870 | 11/1964 | Marino | 324—133 XR |
| 3,215,935 | 11/1965 | Mead | 324—158 |

RUDOLPH V. ROLINEC, *Primary Examiner.*

E. L. STOLARUN, *Assistant Examiner.*

U.S. Cl. X.R.

324—133